United States Patent
Andarawis et al.

(10) Patent No.: US 7,215,129 B1
(45) Date of Patent: May 8, 2007

(54) MULTI TIP CLEARANCE MEASUREMENT SYSTEM AND METHOD OF OPERATION

(75) Inventors: Emad Andarawis Andarawis, Ballston Lake, NY (US); Samhita Dasgupta, Niskayuna, NY (US); Shobhana Mani, Clifton Park, NY (US); Weiguo Chen, Shanghai (CN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/393,584

(22) Filed: Mar. 30, 2006

(51) Int. Cl.
*G01R 27/26* (2006.01)

(52) U.S. Cl. .................. 324/662; 324/661; 324/690

(58) Field of Classification Search ................ 324/662, 324/661, 690
See application file for complete search history.

(56) References Cited

U.S. PATENT DOCUMENTS

| | | | |
|---|---|---|---|
| 4,063,167 A | 12/1977 | Duly | |
| 4,806,848 A | 2/1989 | Demers | |
| 4,847,556 A * | 7/1989 | Langley | ................ 324/207.18 |
| 6,556,957 B1 * | 4/2003 | Daumer | .................... 702/193 |
| 6,692,222 B2 | 2/2004 | Prinz et al. | |

FOREIGN PATENT DOCUMENTS

EP        0879394 B1    2/2004

\* cited by examiner

*Primary Examiner*—Andrew H. Hirshfeld
*Assistant Examiner*—Amy He
(74) *Attorney, Agent, or Firm*—Richard A. DeCristofaro; Patrick K. Patnode

(57) ABSTRACT

A multi tip clearance measurement system is provided. The clearance measurement system includes a sensor disposed on a first object, wherein the sensor comprises a plurality of probe tips configured to generate signals representative of a sensed parameter corresponding to a second object and a processing unit configured to evaluate the signals from subsets of the sensed parameters from the probe tips to detect an outlier probe tip and to adjust a gain, or an offset of the respective outlier probe tip for estimating the clearance between the first and second objects based upon the signals.

17 Claims, 5 Drawing Sheets

MULTI TIP CLEARANCE MEASUREMENT SYSTEM AND METHOD OF OPERATION

BACKGROUND

The invention relates generally to clearance measurement systems, and more particularly to, a multi tip clearance measurement system for measuring a clearance between a stationary component and a movable component of a rotating machine.

Various types of sensors have been used to measure the distance between two objects. In addition, these sensors have been used in various applications. For example, a steam turbine has a rotating bucket that is disposed adjacent a carrier. The clearance between the rotating bucket and the carrier varies due to various operating conditions, such as changes in temperature, oxidation of the bucket tip, and so forth. It is desirable that a gap or clearance between the rotating bucket and the carrier be maintained during operation of the steam turbine.

One existing sensor is a multi tip capacitance sensor that includes multiple probe tips to measure capacitance for estimating the radial and axial clearance between stationary and movable components. Typically, the estimated clearance is a function of gain of all the signals from all the probe tips of the sensor. Unfortunately, an error in this gain, or a drift over a period time causes the system performance to deteriorate. Further, certain systems employ signal processing to evaluate the health of the individual signals from the probe tips and transfer functions are used to convert the measured signal to clearance. Again, error correction of individual gain of the probe tips is not addressed in such systems.

Moreover, these clearance measurement systems are typically employed to measure clearances between components during design and offline testing. Unfortunately, these existing systems are ineffective for in-service measurements due to the noise and drift generated by changes in the geometry of the components, among other factors. Instead, in-service clearance control is based on the clearance measurements previously taken during design and offline testing of components. As the components become worn during service, the offline measurements become ineffective for in-service clearance control.

Accordingly, a need exists for providing a multi tip clearance measurement system that provides an accurate measurement of clearance between two components by detecting and correcting single tip errors and drifts. It would also be advantageous to provide a self-calibrating clearance measurement system that could be employed for accurate clearance measurement for parts in operation.

BRIEF DESCRIPTION

Briefly, according to one embodiment a multi tip clearance measurement system is provided. The clearance measurement system includes a sensor disposed on a first object, wherein the sensor comprises a plurality of probe tips configured to generate signals representative of a sensed parameter corresponding to a second object and a processing unit configured to evaluate the signals from subsets of the sensed parameters from the probe tips to detect an outlier probe tip and to adjust a gain, or an offset of the respective outlier probe tip for estimating the clearance between the first and second objects based upon the signals.

In another embodiment, a method of measuring clearance between first and second objects is provided. The method includes receiving a plurality of signals representative of a sensed parameter corresponding to the first or second object via a sensor having a plurality of probe tips and estimating the clearance between the first and second objects based upon simultaneous subsets of the sensed parameters from the probe tips. The method also includes analyzing the estimated clearance from the subsets of sensed parameters from the probe tips to detect an outlier probe tip and adjusting a gain, or an offset of the outlier probe tip to estimate the clearance based upon the plurality of signals.

In another embodiment, a method of measuring clearance between first and second objects is provided. The method includes receiving a plurality of signals representative of a sensed parameter corresponding to the first or second object via a sensor having a plurality of probe tips and estimating the clearance between the first and second objects based upon simultaneous subsets of the sensed parameters from the probe tips. The method also includes analyzing the estimated clearance from the subsets of sensed parameters from the probe tips to detect an outlier probe tip and estimating the clearance based upon the signals from the probe tips other than the outlier probe tip.

In another embodiment, a rotating machine is provided. The rotating machine includes a rotating component spaced apart from a stationary component and a sensor disposed on the stationary component, wherein the sensor comprises a plurality of probe tips configured to generate signals representative of a sensed parameter corresponding to the rotating component. The rotating machine also includes a processing unit configured to evaluate the signals from subsets of the sensed parameters from the probe tips to detect an outlier probe tip and to adjust a gain, or an offset of the respective outlier probe tip for estimating the clearance between the stationary and rotating components based upon the signals.

In another embodiment, a method of monitoring health of a multi tip clearance measurement system is provided. The method includes receiving a plurality of signals representative of a sensed parameter corresponding to a first or a second object via a sensor having a plurality of probe tips and storing the plurality of signals received from the plurality of probe tips. The method also includes estimating the clearance between the first and second objects based upon simultaneous subsets of sensed parameters from the probe tips and analyzing the estimated clearance from the subsets of the sensed parameters from the probe tips to detect an outlier probe tip.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
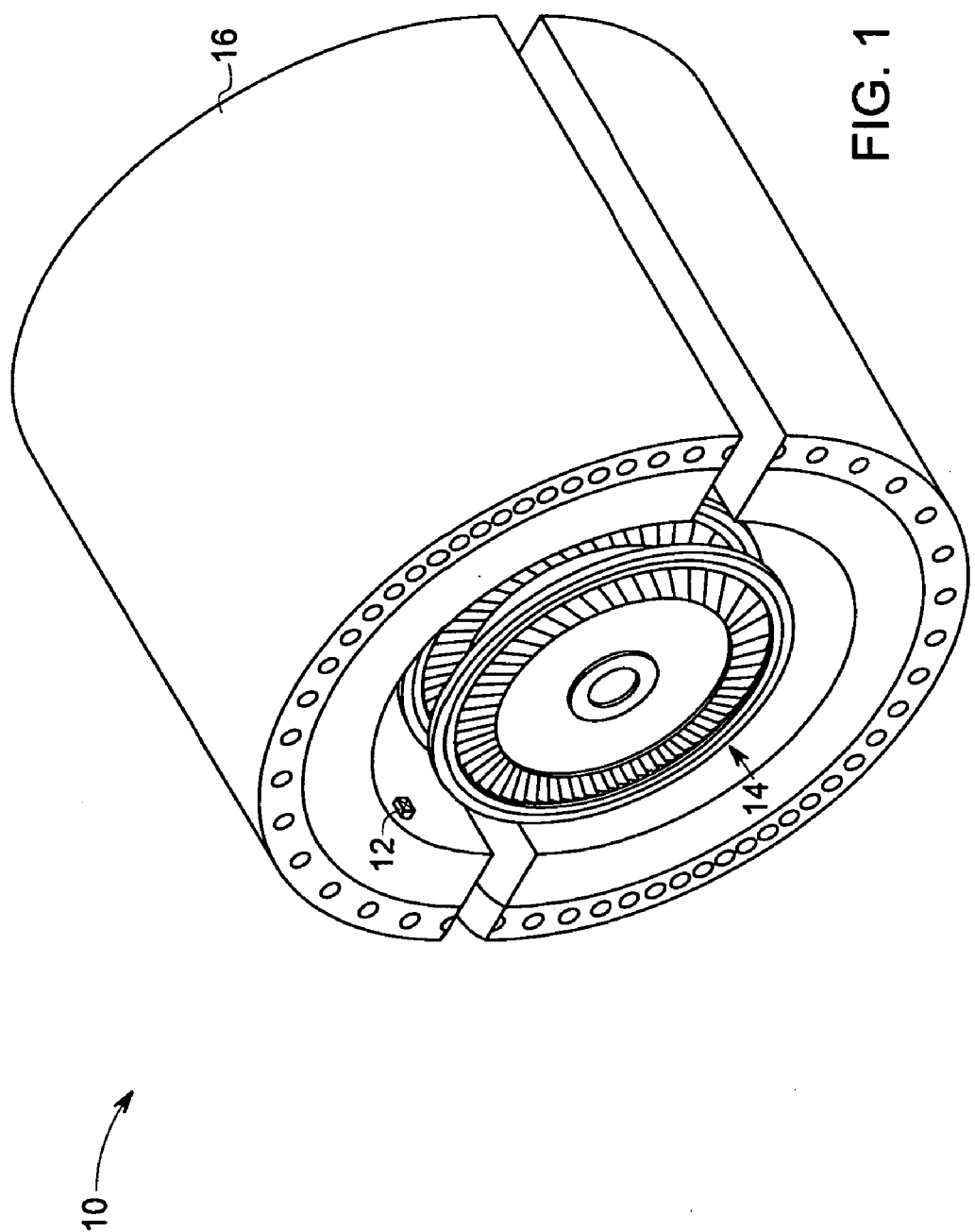
FIG. 1 is a diagrammatical perspective illustration of a steam turbine having a multi tip clearance measurement system in accordance with embodiments of the present technique.

As discussed in detail below, embodiments of the present technique function to provide an accurate measurement of clearance between two objects in various systems such as a steam turbine, a generator, a turbine engine (e.g., airplane turbine engine), a machine having rotating components and so forth. In particular, the present technique employs a signal correlation method for gain error correction in a radial and axial clearance measurement system to detect and correct for probe tip errors and drifts. Referring now to the drawings, FIG. 1 illustrates a steam turbine 10 having a multi tip clearance measurement system 12 for measuring a clearance between two objects in the steam turbine 10. In the illustrated embodiment, the clearance measurement system 12 includes a sensor having a plurality of probe tips that is configured for measuring the clearance between a rotating component 14 and a stationary component 16 in the steam turbine 10, which will be described in detail below.

Figure 2:
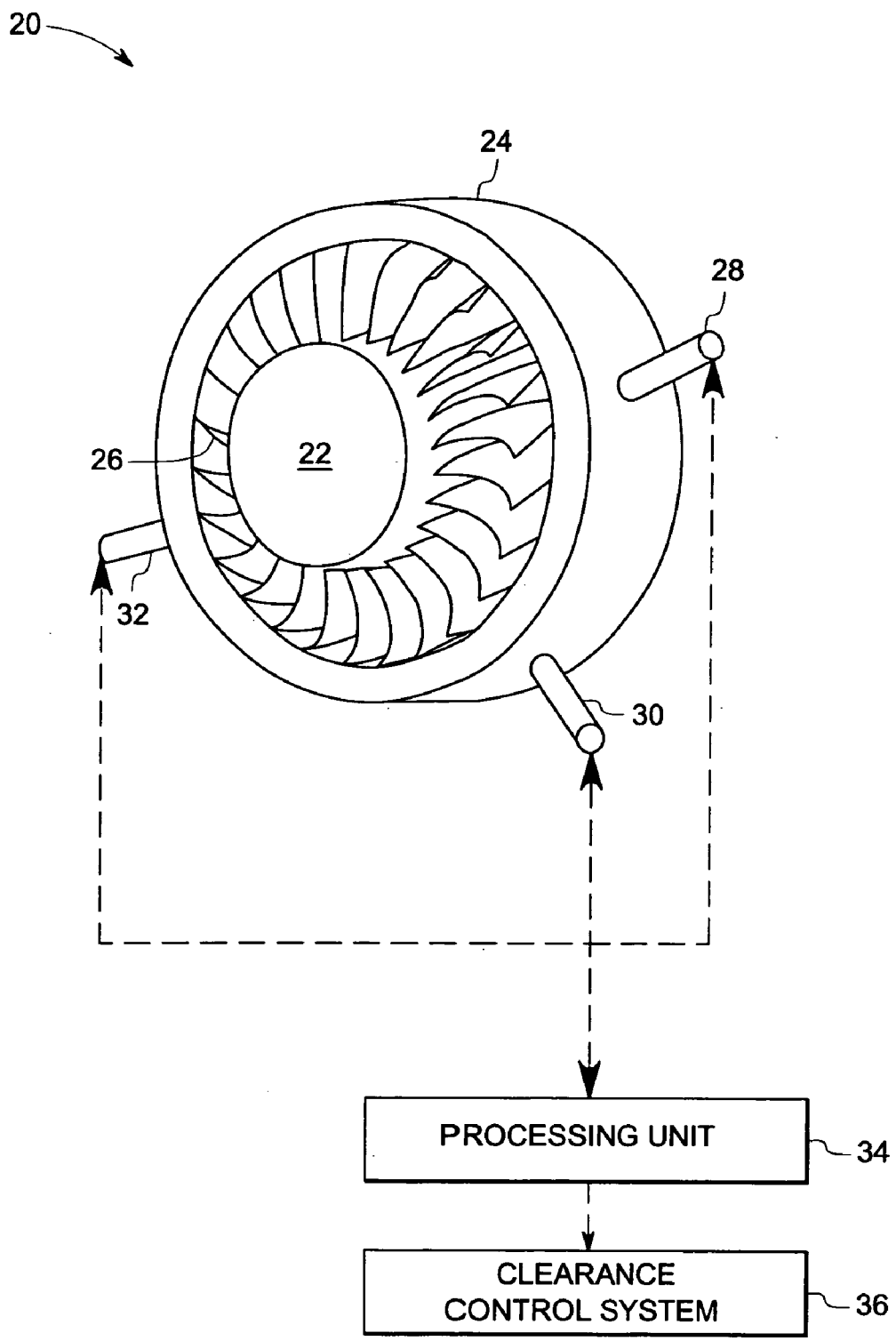
FIG. 2 illustrates a perspective view of the steam turbine of FIG. 1 having the multi tip clearance measurement system for measuring the clearance between the rotating buckets and the carrier in accordance with embodiments of the present technique.

FIG. 2 illustrates a rotating machine, such as a steam turbine 20 as illustrated in FIG. 1, wherein aspects of the present technique can be incorporated to measure clearance between rotating and stationary components. The steam turbine 20 includes a rotor 22 disposed within a stationary housing 24. A plurality of turbine blades 26, which may also be referred to as buckets, are affixed to the rotor 22. In operation, the blades 26 are subjected to steam at a high temperature and pressure, which causes the blades 26 to rotate about an axis. The blades 26 rotate within the stationary housing or shroud 24 that is positioned radially and circumferentially around the blades 26. A relatively small clearance exists between the blades 26 and the shroud 24 to facilitate rotation of the blades 26 within the shroud 24, while also preventing excessive leakage of the working fluid, i.e. steam, between the blades 26 and the shroud 24. In accordance with the present technique, one or more clearance sensors, such as represented by reference numerals 28, 30 and 32 are disposed circumferentially around the stationary shroud 24. In the illustrated embodiment, each of the clearance sensors 28, 30 and 32 includes a plurality of probe tips configured to generate signals representative of a sensed parameter corresponding to the blades 26. Further, the clearance between the blades 26 and the shroud 24 is estimated as a function of the gain of signals from all the probe tips.

In an exemplary embodiment, the clearance sensors 28, 30 and 32 include capacitive probes and the sensed parameter includes capacitance. In an alternate embodiment, the clearance sensors 28, 30 and 32 include eddy current sensors and the sensed parameter includes an induced current. As explained in detail below, each of the sensors 28, 30 and 32 is configured to generate a signal indicative of a radial and an axial position of the blades 26 with respect to the shroud 24 at their respective circumferential locations.

In the embodiment illustrated in FIG. 2, signals representative of the sensed parameters are detected by the sensors 28, 30 and 32, and the signals are then transmitted to a processing unit 34 for processing the signals. In particular, simultaneous subsets of sensed parameters from the probe tips are evaluated to detect an outlier probe tip for estimating the clearance between the blades 26 and the shroud 24. Moreover, an offset or a gain of the respective outlier probe tip is adjusted to bring it into agreement with the other subsets, and to estimate the clearance between the blades 26 and the shroud 24. Further, the clearance measurement through the sensors 28, 30 and 32 is used for controlling the clearance between the shroud 24 and the turbine blades 26 via a clearance control system 36. The technique for detection of the outlier probe tip for each of the sensors 28, 30 and 32 will be described in a greater detail below with reference to FIGS. 5–6.

Figure 3:
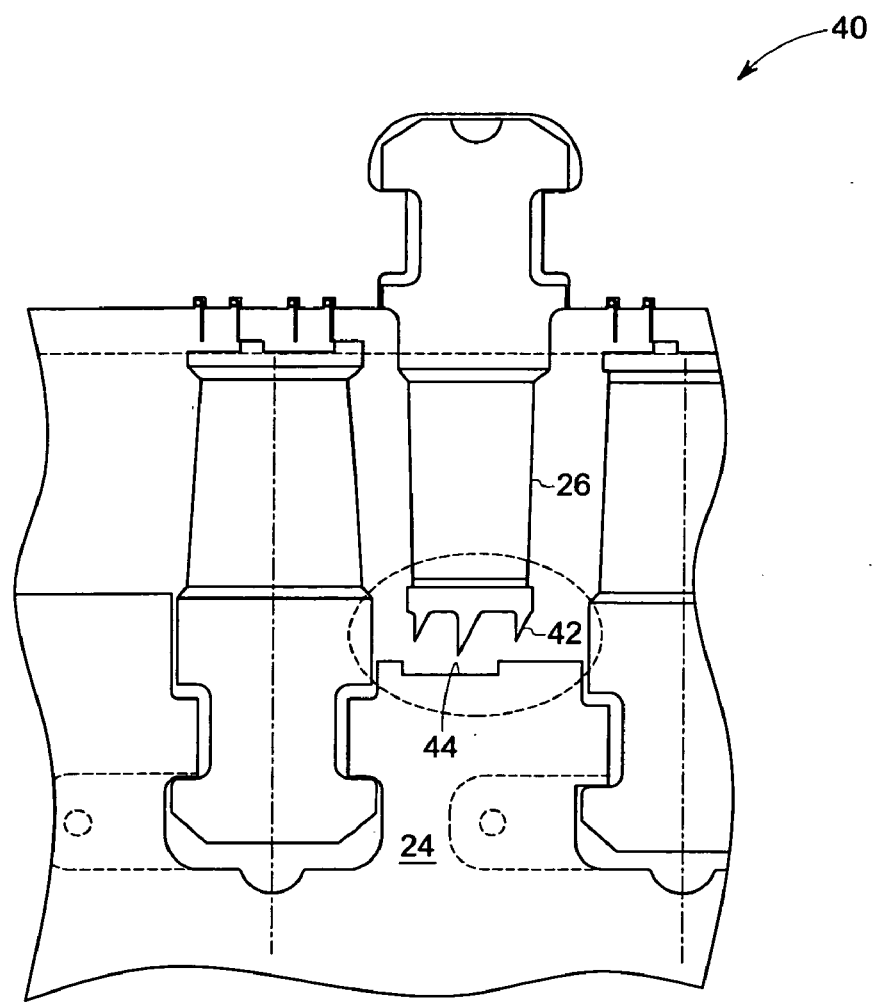
FIG. 3 is a cross-sectional view of a portion of the steam turbine of FIG. 2 wherein the present clearance control technique can be used in accordance with embodiments of the present technique.

Referring now to FIG. 3, a cross-sectional view is shown for a bottom or lower portion 40 of the steam turbine 10 of FIG. 1, illustrating exemplary radial and axial clearance that may be measured by the present technique. In the illustrated embodiment, the tip of the blade 26 includes packing teeth or seal teeth 42 that mesh into a groove 44 provided on the inner circumference of the shroud 24. In a present embodiment, the clearance measurement system 12 (see FIG. 1) may be coupled to the shroud 24 for measuring the radial and axial clearances between the tip of the blade 26 and the shroud 24.

Figure 4:
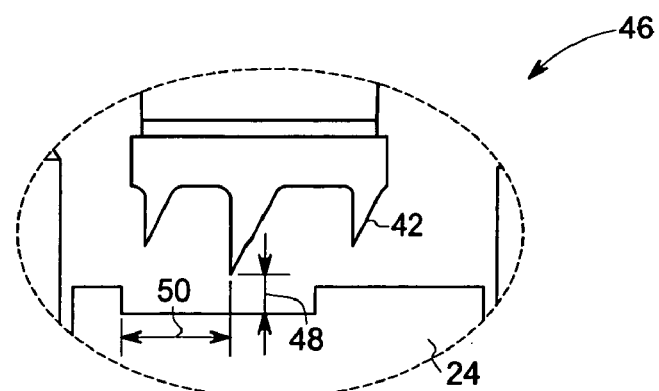
FIG. 4 is a detailed cross-section view of FIG. 3 in accordance with embodiments of the present technique.

FIG. 4 is a detailed cross-section view of a portion 46 of the shroud and blade of the steam turbine of FIG. 3. As illustrated, the radial clearance between the seal teeth 42 and the shroud 24 is represented by reference numeral 48 and the axial clearance between the teeth 42 and the shroud 24 is represented by reference numeral 50. In a present embodiment, the radial and axial clearances 48 and 50 represent the clearances between the center tooth and the shroud. As will be appreciated by one skilled in the art, clearances between the other seal teeth and the shroud 24 may be similarly estimated through the present technique.

In certain embodiments, due to differences in the rate of thermal expansion of the shroud 24 and the rotor 26, there is a potential that the radial clearance 48 may be reduced to zero, leading to interference between the seal teeth 42 and the groove 44. Further, due to this differential rate of expansion, the rotor 26 may grow axially with respect to the shroud 24, leading to axial rubbing of the teeth 42 within the groove 44, thus increasing the rate of wear on the components. These undesirable interferences also can lead to damage of the components. The present technique provides an on-line measurement of radial and axial clearances 48 and 50, which may be incorporated into a closed-loop control strategy to maintain these clearances at values within acceptable limits. The control strategy may include, for example, thermal actuation of the shroud 24, causing it to appropriately expand when the clearance between the shroud 24 and the seal teeth 42 decreases. In this embodiment, thermal actuators utilize the property of thermal expansion to produce movement of the shroud 24. In certain other embodiments, mechanical actuators may be used to compensate for axial growth of the blade 26 within the shroud 24.

As will be appreciated by those of ordinary skill in the art, the capacitance between two objects is a function of the overlap surface area and the separation between the two objects. In the present embodiment, the capacitance between the rotor 26 and the shroud 24 is a function of the radial clearance 48 and the overlap area, which in turn is directly proportional to the axial clearance 50 of the seal teeth 42 with respect to the shroud 24. As the rotor 26 expands radially, the radial clearance 48 between the seal teeth 42 and the shroud 24 changes. Similarly, as the seal teeth 42 move axially across the groove 44, the area of the sensor head covered by the seal teeth 42 will change. These changes will result in a change in measured capacitance. In accordance with aspects of the present technique discussed below, the change in capacitance can be correlated to axial and radial displacements and hence a composite clearance measurement may be obtained. The measurement of radial and axial clearances 48 and 50 via the multi tip clearance measurement system 12 will be further described below with reference to FIGS. 5–6.

As described before, the multi tip clearance measurement system 12 includes a sensor having a plurality of probe tips configured to generate signals representative of a sensed parameter. Additionally, the signals from subsets of the probe tips are evaluated via a processing unit 34 (see FIG. 2) for estimating the clearance between two objects. In particular, the signals from the plurality of probe tips are evaluated against each other to detect an outlier probe tip and to adjust a gain or an offset of the respective outlier probe tip to bring it inline with the other tips for estimating the clearance between the two objects. In an exemplary embodiment, the sensor comprises at least three probe tips. In another embodiment, the sensor includes at least four probe tips configured to measure radial and axial clearances 48 and 50 between the stationary and rotating components 24 and 26 as described below with reference to FIG. 5.

Figure 5:
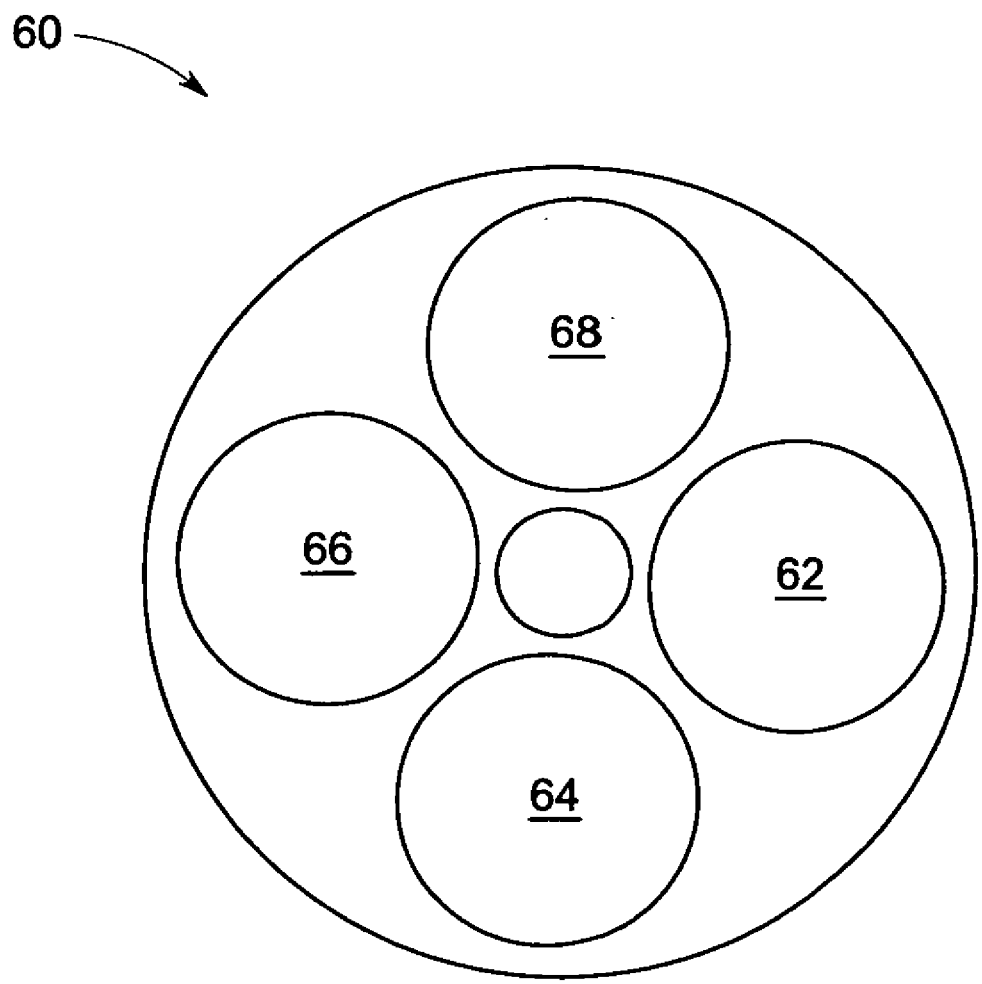
FIG. 5 illustrates an exemplary configuration of sensors employed for the multi tip clearance measurement system of FIG. 1 in accordance with embodiments of the present technique.

FIG. 5 illustrates a plan view of an exemplary configuration 60 of the sensors 26, 28 and 30 employed for the multi tip clearance measurement system 12 of FIG. 1. In the illustrated embodiment, the sensor 60 includes a plurality of capacitive probe tips 62, 64, 66 and 68 which may include, for example, electrically conductive shafts. The illustrated geometry and relative locations of the probes 62, 64, 66 and 68 facilitate measurement of a large axial displacement range, for example, in excess of 0.5 inches, while providing a desirable resolution for radial measurements, for example, for measuring displacements on the order of 0.01 inches. The above feature is advantageous in applications where the axial displacements of the rotating component 14 (see FIG. 1) are substantially larger than the radial displacements with respect to the shroud 16 (see FIG. 1). In certain other applications, where the radial displacements are larger than the axial displacements, larger probe tips may be required. Further, such arrangement will require relatively large axial separation to achieve the desired axial resolution. In one embodiment, the sensor 60 may include oval elements. In an alternate embodiment, the sensor 60 may include overlapping triangular elements.

In the illustrated embodiment, the probes 62, 64, 66 and 68 are positioned in a staggered manner, having a diamond shaped configuration, on the sensor head to maximize sensitivity to change in overlap area. Other staggered configurations may be conceived in embodiments having greater or lesser number of probes. The diameters of the probes 62, 64, 66 and 68 at the head or tip portion are suitably large enough to provide adequate overlap surface area between them and the tip of the blade 14. In the illustrated embodiment, i.e. for a steam turbine application, the probes 62, 64, 66 and 68 may be formed from a material comprising nickel, aluminum, cobalt, or combinations thereof, such as Kovar. However, in applications involving higher temperatures (e.g., temperatures in excess of 1000 degrees centigrade), a material comprising platinum, rhodium, or combinations thereof may be used for the probes 62, 64, 66 and 68.

The probe tips 62, 64, 66 and 68 are configured to generate signals representative of capacitance between the stationary and rotating components 16 and 14 (see FIG. 1). Further, the clearance between the stationary and rotating components 16 and 14 is estimated based upon simultaneous subsets of the sensed capacitances from the probe tips 62, 64, 66 and 68. In the illustrated embodiment, each subset includes sensed capacitances from at least two probe tips. As will be appreciated by one skilled in the art, based upon a sensor configuration subsets of sensed parameters for a greater number of probe tips may be envisaged. In an exemplary embodiment, for the probe tip configuration 60 described above, six subsets of the sensed capacitances may be analyzed for the clearance estimation. For example, in the illustrated embodiment, a first subset includes sensed capacitance from probe tips 62 and 64 and a second subset includes sensed capacitances from the probe tips 62 and 66. Similarly, a third subset includes sensed capacitance from probe tips 62 and 68 and a fourth subset includes sensed capacitances from the probe tips 64 and 66. Further, a fifth subset includes sensed capacitances from the probe tips 64 and 68 and a sixth subset includes sensed capacitances from the probe tips 66 and 68. Another three subsets of three tips each may also be analyzed.

In operation, a clearance look-up is performed for each of the subsets described above via the processing unit 34 (see FIG. 2). The processing unit 34 may employ a look-up table, or a calibration curve, or an analytical table, or a calculation, or combinations thereof for estimating the clearance based upon the sensed capacitances. In certain embodiments, some of the subsets may experience a large clearance due to an error or drift and therefore may be eliminated from the evaluation. Depending on the axial position, some subsets may be physically far away from the bucket, this have a very small signal present. Typically, the small signal is more likely to be dominated by noise or other such error sources. Such subsets may be eliminated from consideration, or may be weighted lower than other subsets. If the estimated clearance from all the remaining simultaneous subsets is in agreement then the signals are considered to be healthy and the clearance estimation is completed based upon the signals from such subsets. Alternatively, if the estimated clearance from all the simultaneous subsets is not in agreement then such signals are analyzed to detect an outlier tip among the plurality of probe tips 62, 64, 66 and 68.

For example, if the sensed capacitances from the first and fourth subsets including probe tips 62, 64 and 64, 66 exhibit a large error in the estimated clearance from these subsets then the probe tip 64 is detected to be the outlier tip. In one embodiment, the clearance may be estimated from the signals from the tips other than the outlier tip. For example, in this embodiment, the clearance may be estimated by processing the signals from the probe tips 62, 66 and 68. In an alternate embodiment, a gain or an offset of the outlier tip may be adjusted to bring it in agreement with the other probe tips thus correcting for performance drifts that may happen over a period of time. Thus, in the above exemplary embodiment, the clearance is estimated from the probe tips 62, 66, 68 along with the probe tip 64 with an adjusted gain.

Figure 6:
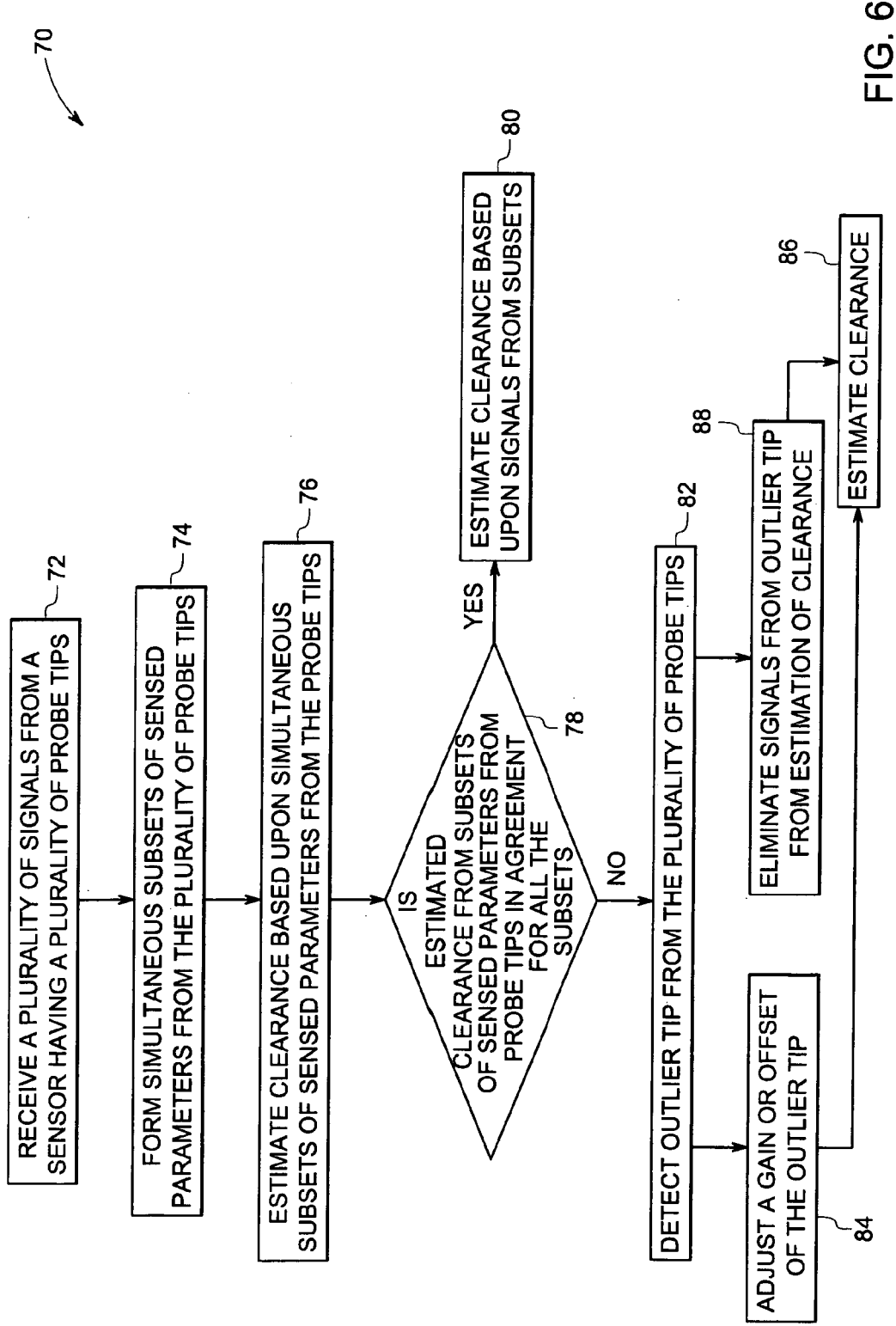
FIG. 6 is a flow chart illustrating a method of operating the multi tip clearance measurement system of FIG. 1 in accordance with embodiments of the present technique.

FIG. 6 is a flow chart illustrating a process 70 of operating the multi tip clearance measurement system 12 of FIG. 1. The process includes receiving a plurality of signals from a sensor having a plurality of probe tips, as represented by step 72. The plurality of signals are representative of a sensed parameter between first and second objects. In one embodiment, the sensor includes a capacitive probe and the sensed parameter includes capacitance. Alternatively, the sensor includes an eddy current sensor and the sensed parameter includes an induced current. At step 74, a plurality of simultaneous subsets of sensed parameters are formed. In one embodiment, each simultaneous subset includes sensed parameters from at least two probe tips. Further, as represented by step 76, the clearance between the first and second objects is estimated based upon each of the simultaneous subsets of the sensed parameters from the probe tips via a processing unit. In certain embodiments, a look-up table, or a calibration curve, or an analytical table, or a calculation, or combinations thereof may be employed for estimating the clearance based upon the sensed parameters.

At step 78, the processing unit determines if the estimated clearance from the simultaneous subsets of sensed parameter are in agreement for all the subsets. If the estimated clearance is in agreement for the subsets, then the clearance processing is completed and the clearance between the first and second objects is estimated based upon signals from all such subsets (step 80). Alternatively, if the estimated clearance from the subsets is not in agreement for all the subsets, then the processing unit determines the outlier probe tip that is contributing to the error in the gain (step 82). It should be noted that the term "gain" refers to the gain of the complete clearance measurement system 12 including the electronics. For example, in one embodiment, if a probe tip erodes and becomes smaller in size, the electronics gain in the system will not change but the overall signal will get smaller thereby contributing to an effect of decrease in the gain of the system.

In one embodiment, the gain or offset of the outlier tip is adjusted to bring it in agreement for the rest of the probe tips, as represented by step 84. Further, as represented by step 86, the clearance is estimated based upon signals from all the probe tips including the outlier probe tip with an adjusted gain or offset. In an alternate embodiment, the signals from the outlier probe tip are eliminated from the clearance estimation and the clearance is estimated based upon the signals from the probe tips other than the outlier tip (steps 88 and 86). It should be noted that the detection of the outlier tip among the plurality of probe tips of the multi tip clearance system facilitates monitoring of health of the clearance measurement system. In one embodiment, the outlier tip may be replaced for an accurate estimation of the clearance from the clearance measurement system. Alternatively, the signals from the outlier probe tip may be eliminated from the clearance estimation, or a gain of the outlier probe tip may be adjusted to correct the error or drift due to the respective probe tip.

The various aspects of the method described hereinabove have utility in different applications. For example, the technique illustrated above may be used for measuring the clearance between rotating and static components in a steam turbine. The technique may also be used in certain other applications, for example, for measuring clearance between stationary and rotating components in generators. As above, even more generally, the method described herein may be advantageous for providing accurate measurement of clearance between objects through a multi tip clearance measurement system by using data subsets for error detection and drift tracking of sensor elements thereby reducing the level of signal conditioning required. Further, the technique is particularly advantageous to provide a self-calibrating sensor system for accurate clearance measurement of parts, even in operation and over extended periods of time, enabling better clearance control in parts while in operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multi tip clearance measurement system, comprising:
    a sensor disposed on a first object, wherein the sensor comprises a plurality of probe tips configured to generate signals representative of a sensed parameter corresponding to a second object; and
    a processing unit configured to evaluate the signals from subsets of the sensed parameters from the probe tips to detect an outlier probe tip and to adjust a gain, or an offset of the respective outlier probe tip to bring the signal from the outlier probe tip into agreement with the other signals for estimating the clearance between the first and second objects based upon the signals.

2. The system of claim 1, wherein the sensor comprises at least three probe tips.

3. The system of claim 1, wherein the processing unit is configured to estimate the clearance between the first and second objects by processing the signals corresponding to the probe tips other than the outlier probe tip.

4. The system of claim 1, wherein the sensor comprises a capacitive sensor and wherein the sensed parameter comprises a capacitance.

5. The system of claim 1, wherein the sensor comprises an eddy current sensor and wherein the sensed parameter comprises an induced current.

6. The system of claim 1, wherein the second object comprises a rotating component and the first object comprises a stationary component disposed about the rotating component.

7. The system of claim 6, wherein the sensor comprises at least four probe tips configured to measure radial and axial clearances between the stationary and rotating components.

8. The system of claim 7, wherein each subset of the sensed parameters from the probe tips comprises parameters from at least two probe tips.

9. The system of claim 1, wherein the processing unit comprises a look-up table, or a calibration curve, or an analytical model, or a calculation, or combinations thereof for estimating clearance and for detecting the outlier probe tip based upon the signals from the subsets of sensed parameters from the probe tips.

10. A rotating machine, comprising:
    a rotating component spaced apart from a stationary component;
    a sensor disposed on the stationary component, wherein the sensor comprises a plurality of probe tips configured to generate signals representative of a sensed parameter corresponding to the rotating component; and
    a processing unit configured to evaluate the signals from subsets of the sensed parameters from the probe tips to detect an outlier probe tip and to adjust a gain, or an offset of the respective outlier probe tip to bring the signal from the outlier probe tip into agreement with the other signals for estimating the clearance between the stationary and rotating components based upon the signals.

11. The rotating machine of claim 10, wherein the processing unit is configured to estimate the clearance between the stationary and rotating components by processing the signals corresponding to the probe tips other than the outlier probe tip.

12. The rotating machine of claim 10, wherein the sensor comprises a capacitive sensor and wherein the sensed parameter comprises a capacitance.

13. The rotating machine of claim 10, wherein the sensor comprises an eddy current sensor and wherein the sensed parameter comprises an induced current.

14. The rotating machine of claim 10, wherein the sensor comprises at least four probe tips configured to measure radial and axial clearances between the stationary and rotating components.

15. The rotating machine of claim 10, wherein the processing unit comprises a look-up table, or a calibration curve, or an analytical model, or a calculation, or combinations thereof for estimating clearance and detecting the outlier probe tip based upon the signals from subsets of probe tips.

16. The rotating machine of claim 10, wherein the rotating machine comprises a steam turbine, or a generator, or an electric motor, or a pump, or a compressor.

17. The rotating machine of claim 16, wherein the rotating component comprises a rotating bucket and the stationary component comprises a carrier disposed about the rotating bucket.

* * * * *